J. E. OLLIVIER.
DRIVING MECHANISM FOR AUTOSLEDS.
APPLICATION FILED FEB. 29, 1916.
1,225,999.
Patented May 15, 1917.
2 SHEETS—SHEET 1
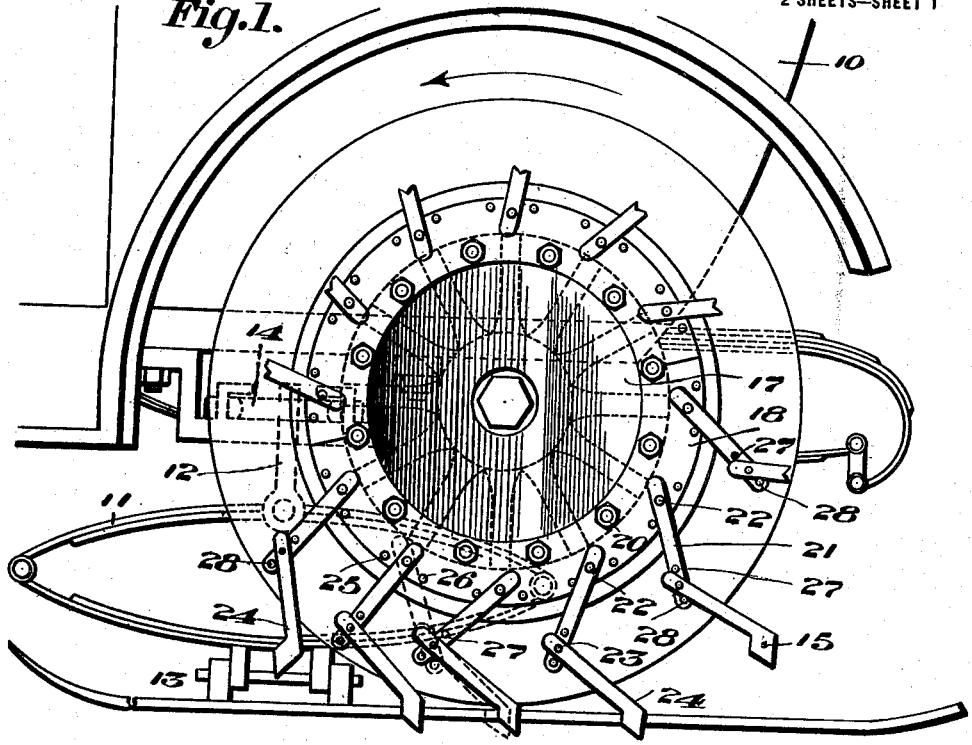
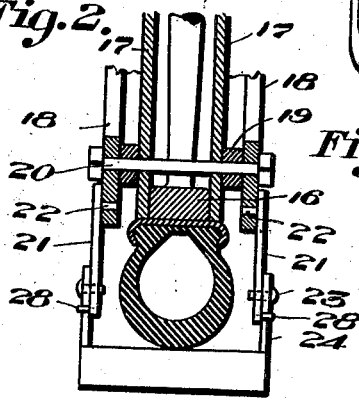
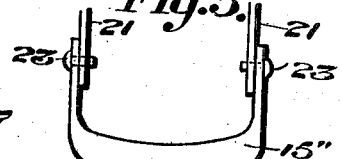
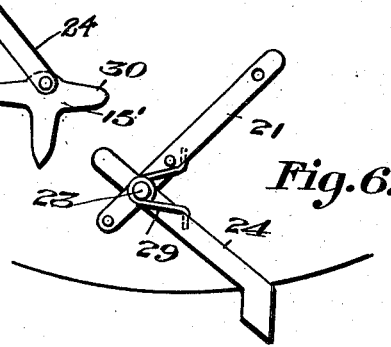
WITNESSES:
INVENTOR
Jocelyn Emile Ollivier
BY
ATTORNEY J. E. OLLIVIER.
DRIVING MECHANISM FOR AUTOSLEDS.
APPLICATION FILED FEB. 29, 1916.
1,225,999.
Patented May 15, 1917.
2 SHEETS—SHEET 2.
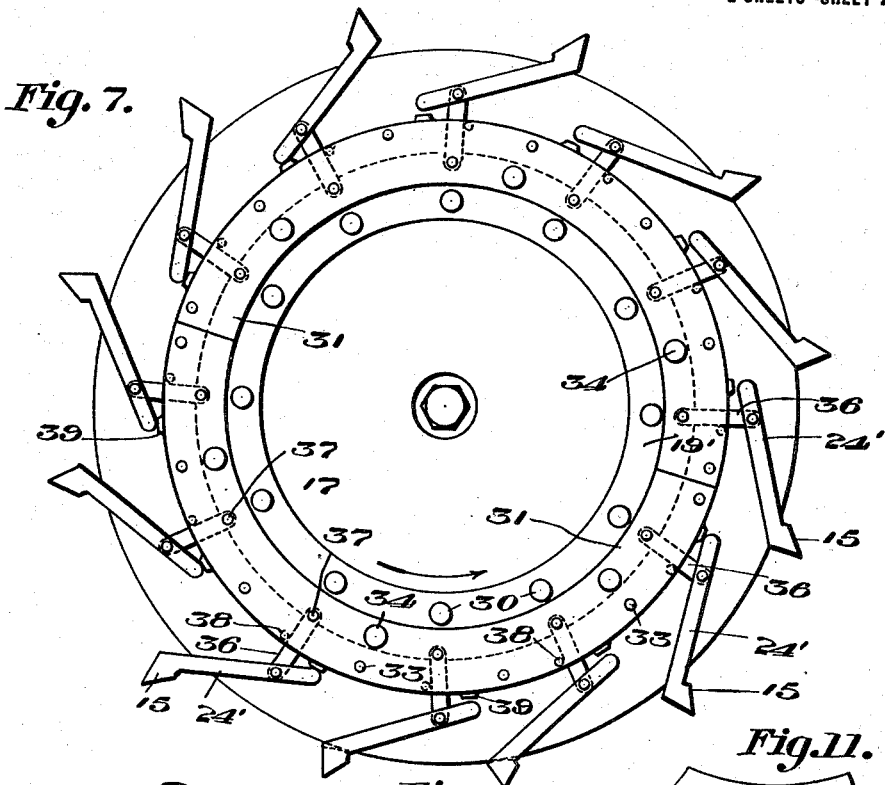
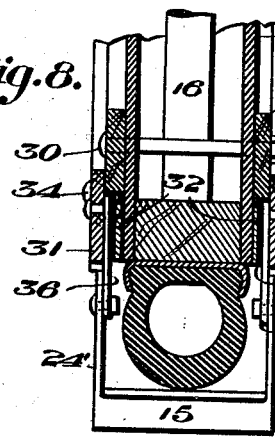
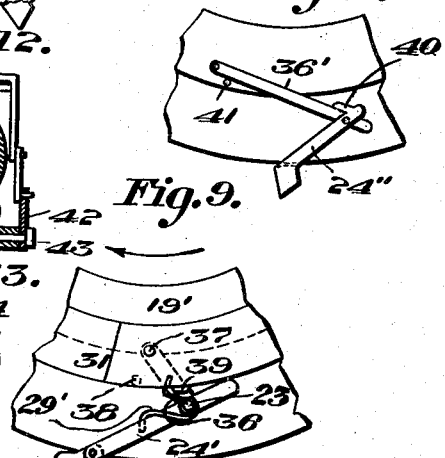
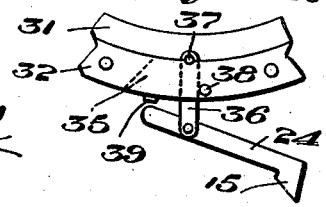
WITNESSES:
INVENTOR
BY
ATTORNEY

UNITED STATES PATENT OFFICE.

JOCELYN EMILE OLLIVIER, OF LA VIGNETTE, ST. GERVAIS LES BAINS, FRANCE.

DRIVING MECHANISM FOR AUTOSLEDS.

1,225,999.   Specification of Letters Patent.   Patented May 15, 1917.

Application filed February 29, 1916. Serial No. 81,151.

*To all whom it may concern:*

Be it known that I, JOCELYN EMILE OLLIVIER, citizen of the Republic of France, residing at La Vignette, St. Gervais les Bains, France, have invented new and useful Improvements in Driving Mechanism for Autosleds, of which the following is a specification.

This invention relates to an automobile sled and more particularly to the driving means therefor.

My invention has as its objects to provide an improved driving means which may be readily attached to the wheel of an automobile to transform the same into an automobile sled; to provide the wheels of the automobile with driving means which permit propulsion of the automobile in both a forward and a rearward direction without changing, adjusting or regulating the driving means; and to pivot the spikes of the driving means in such manner that they are enabled to sustain the strain and weight placed upon them, and the liability of breaking is reduced to a minimum.

The above and other objects of my invention are obtained by the structures shown in the drawings which accompany this specification, and wherein—

Figure 1 is an elevational view of the rear end of an automobile having secured to the wheel thereof one embodiment of my improved driving mechanism.

Fig. 2 is a partial sectional view through the wheel and driving means shown in Fig. 1.

Fig. 3 is a front elevational view showing a different form of my improved spike.

Fig. 4 is a perspective view of another form of spike.

Fig. 5 is an elevational view of a spike pivoted to the outer end of an arm.

Fig. 6 is a side elevation of one unit of my driving means showing the same provided with a spring.

Fig. 7 is an elevational view of an automobile wheel having applied thereto another embodiment of my improved driving mechanism.

Fig. 8 is a partial sectional view taken through the wheel and driving means shown in Fig. 7.

Fig. 9 is a partial detailed view showing the position which the spike assumes when the wheel is driven in the reverse direction.

Fig. 10 is a detailed inside view of the annular ring to which my improved spike is secured.

Fig. 11 is a partial elevational view disclosing another embodiment of my improved spike.

Figs. 12 and 13 are sectional and elevational views, respectively, disclosing a modified construction for mounting my spikes to the wheel.

Referring to the drawings, wherein like numerals represent like parts, 10 designates an automobile body which may be of any desired shape, and which is provided with the usual wheels. Secured to the body of the automobile, by means of a spring 11 and a threaded shaft 12 is a runner 13 which may be of any suitable shape or configuration, the shaft 12 being threaded to receive a correspondingly threaded gear 14, which gear may be rotated by any suitable means to feed the runner to or from the automobile to vary the distance which a wheel is raised from the surface of the snow or ground.

My improved driving means is mounted preferably on the rear wheel of the automobile, and comprises suitable spikes pivoted to the wheels thereof. Referring to Figs. 1 and 2, wherein is disclosed one embodiment of my invention, 15 designates one form of spike which may be used, although, of course, its construction and manner of mounting may be changed as desired. To either face of the wheel and engaging adjacent their outer peripheries the felly 16 are disks or cheeks 17. 18 designates annular rings spaced slightly from the cheeks 17 by means of annular rings or spacing crowns 19, and these rings are provided with a series of spaced-apart openings along their entire circumference. The cheeks 17, crowns 19 and rings 18 are tightly and securely held in place upon the wheel by means of suitable bolts or tie rods 20. Preferably, the annular rings are split, or formed of two semi-circles so that they together with the spikes, may be readily removed from the wheel. Any desired number of bolts or rods 20 may be used. If desired, separate bolts may be used to independently secure the crown 19 to the cheeks 17 so that the crown is always held in place.

The links or rods 21 are pivoted to the annular rings 18 through the medium of pintles 22 engaging in the openings provided in said rings, and to the outer ends of the links 21 are pivoted, by means of pintles or pins 23, arms 24 which carry at their outer ends the spikes 15, which spikes in the embodiments shown in Figs. 1 and 2 are integral with said arms 24. On the rings 18 adjacent the pivotal point or pintles 22 and on either side of the link 21 are stops 25 and 26, respectively, which are provided to limit the pivotal movement of the links 21. Also provided on the links 21 on either side of the pivotal point 23 are stops 27 and 28 to limit the pivotal movement of the arms 24, which engage against the stops when the wheel is in motion. It is, of course, to be understood that the location of the lugs or stops may be changed as desired.

When the machine is traveling forward, that is to the left in the drawing, the spikes and the arms take the position shown in full lines in Fig. 1, the lowermost spike which is shown in engagement with the surface over which the sled is traveling, having its back against the tire immediately below the pivotal point 22. When the wheel is revolved in the direction of the arrow, the spikes as they leave the ground tend to swing away from the wheel due to centrifugal force, so that snow between the spikes is expelled from the tire. The arms 24 and links 21 are prevented from moving out into a straight radial line, or to double back upon themselves by means of the stops 25 to 28. When the ends of the spikes are about to touch the ground, the points thereof strike first, and the backs of the spikes are forced against the tire, at the same time the links 21 and the arms 24 act as a toggle joint, so that the spikes touching the ground and the pivotal points 22 are in radial line with respect to the wheel.

When the automobile is driven in the reverse direction, the spikes and their arms as the former engage the ground take the position shown in dotted lines, Fig. 1. When the automobile is reversed, the ends of the spikes touch the ground and the spikes are swung backward, the tendency being to straighten out the links 21 and the arms 24 into a straight line until the backs of the spikes engage the tires. The stops 26 and 27 prevent the arms and links from straightening out into a straight line and cause the spikes to engage the tire at the proper time to prevent breakage of the spikes and the arms secured thereto. By this construction, it will be noted that means for retaining the spikes in any given position upon reversing the direction of the automobile is unnecessary, and, at the same time, the spikes are not broken off, or in any way damaged.

If desired, while centrifugal force will throw the spikes out and away from the tire to a certain extent, coiled springs 29, Fig. 6, may be mounted about the pintles 23, one end of said springs being attached to the link 21 and the other end to the arm 24 in such manner that the normal tendency of the arm and link is to straighten out into a straight line, so that when a spike leaves the ground, the same under the influence of the spring 29 plus that of centrifugal force moves radially away from the tire and rejects the snow from the tire which may accumulate between the spikes.

As shown in Fig. 5, a three-point pivot for the spikes is provided, the spikes 15' being pivoted to the outer ends of the arms 24 and the arms being pivoted to the links, and the links to the annular ring in the manner above-described. By this construction, the spike is adapted to adjust itself, so that the back of the same properly engages the tire at the proper angle. The spike 15' is provided with projections 30 so that a relatively broad surface is presented against the tire.

In Fig. 3, the back of the spike 15'' is shown as being concaved, so as to accommodate itself more readily to the curvature of the tire.

In Fig. 4, the back of the spike 15'' is curved longitudinally, so that the back of the spike may engage throughout its length the surface of the tire.

Referring now to Figs. 7 and 8 wherein is disclosed another embodiment of my improved driving mechanism, which construction has proved very successful under all conditions, 17 are the cheeks to which are secured annular crowns 19', which crowns are secured to the cheeks by means of independent bolts 30. The members to which my improved spikes are secured comprise an outer semi-circular ring 31 and an inner semi-circular ring 32, the rings being secured together by means of rivets, bolts or the like 33, and the annular rings being secured to the wheel by means of bolts 34. It will be noted that the semi-circular ring 32 is of less height than the ring 31 thereby forming a rabbeted recess which receives the outer circumference of the crown 19'. The inner semi-circular rings 32 are recessed or grooved as at 35, and in said grooves, the links 36 of the pivoted spikes are adapted to swing. The links are pivoted by means of rivets or the like 37, stops 38 being provided to prevent the links from swinging clockwise of the radial line passing through the pivotal point 37, Fig. 7. The free end of the links carry the arms 24' to which are secured the spikes 15. The inner ends of the arms 24' extend beyond the point where they are pivoted to the links 36, and abutments or stops 39 are provided upon the outer circumference of the annular ring 32 against which the inner ends of the arms 24' are adapted to operate. It will be noted that the semi-circular rings 31 and 32 together with the spikes may be removed from the wheel by merely removing the bolts 34 and thus the driving mechanism is readily demountable and can be readily attached without disturbing annular crowns 19'. The links 36 move within a confined space and displacement of the links is therefore obviated.

While I have found that the structures disclosed in Figs. 1 and 2 are of great practical use, the structures shown in Figs. 7 and 8 are preferable, as they are adapted for for all conditions which might prevail. When the vehicle is moving to the left, referring to Fig. 7, which is the ordinary direction of travel, the wheel is revolving in the direction of the arrow, the lugs 38 prevent the links 21 from passing clockwise of the radial line through the pivotal point of the links, and the abutment or lug 39 fixed to the flange prevents the tooth or spike from separating any great distance from the tire, and the arm and link cannot double back upon themselves. When the wheel is operated in the reverse direction, that is, in the direction of the arrow shown in Fig. 9, the link and arms assume the positions shown in that figure. When the end of the spike engages the ground, the link 36 swings in the recess 35 out of radial alinement and the inner ends of the arms 21 move past the abutments 39 and engage the outer periphery or edge of the flange or semi-circular ring 31. At the time of this movement, the spike has embedded itself in the ground and excessive strain between the link and the arm is prevented.

In Fig. 11, I have shown a different manner of securing the spike to the annular flange. In this figure, the inner end of the arms 24'' is provided with an outstanding lug 40 which engages the link 36' so that the arm 24'' and the link 36' cannot swing into alinement with each other. The spike is prevented from moving any distance from the tire by means of a stop or abutment 41.

In Fig. 12, I have disclosed a different construction for mounting the semi-circular rings to which the links and arms are pivoted. In this form, the semi-circular rings 42 are secured directly to the wheel by means of a bolt 43 passing through a bearing in the felly of the wheel. In Fig. 13, I have disclosed a bearing block 44 secured to the felly of the wheel, and which bearing block is adapted to receive a bolt for securing the rings to the wheel. It is, of course, to be understood that any suitable construction for mounting the pivoted spikes to the wheel may be adopted, and by way of illustration, I have shown only a few of these modifications.

It is, of course, obvious that my invention is susceptible of various modifications and changes which would be within the spirit of the invention without departing from the scope of the following claims.

What I claim is:—

1. In combination, a wheel, a spike, and toggle mechanism connecting said spike to said wheel and permitting a swinging movement of said spike.

2. In combination, a wheel, links pivoted to said wheel, arms pivoted to said links, and spikes on the outer ends of said arms and having a swinging movement.

3. In combination, a wheel, a spike, toggle mechanism between the spike and the wheel and permitting swinging movement of said spike, and means for limiting the toggle action of said toggle means.

4. In combination, a wheel, spikes, links pivoted to said wheel, arms pivoted to said links and carrying at their outer ends said spikes, a stop to limit the movement of said link, and a stop for limiting the toggle movement between said arms and links.

5. In combination, a wheel, spikes, links pivoted to said wheel, arms pivoted to said links and carrying at their outer ends said spikes, stops at either side of said links on said wheel, and means for limiting the toggle movement between said arms and links.

6. In combination, a wheel, a swinging spike and a three-point pivot between said spike and wheel.

7. In combination, a wheel, links pivoted to said wheel, arms pivoted to said links, and spikes pivoted to the outer ends of said arms, said arms being free at their outer ends to permit swinging movement of said spikes.

8. In combination, an automobile, a runner for said automobile, a wheel, spikes on said wheel and having angular movement relative to said wheel, and toggle mechanism between said spikes and wheel.

9. In combination, a wheel, links pivoted to said wheel, arms pivoted to said links, spikes on the outer ends of said arms, and means adapted to engage said arms to limit the pivotal movement thereof.

10. In combination, a wheel, links pivoted to said wheel, arms pivoted to said links, spikes on the outer ends of said arms, and resilient means for throwing said spikes away from said wheel.

11. In combination, a wheel, links pivoted to said wheel, arms, pintles for pivoting said arms to said links, spikes on the outer end of said arms, a coiled spring about said pintles engaging said links and arms to throw said spikes away from the wheel and expel the snow therefrom.

12. In combination, a wheel, semi-circular rings demountably secured to said wheel, links pivoted to said semi-circular rings, and arms pivoted to said links and spikes carried on the outer ends of said arms.

13. In combination, a wheel, semi-circular rings demountably attached to said wheel and having spaced apart recesses or grooves links pivotally mounted on said semi-circular rings in said recesses or grooves and spikes connected to said links.

14. In combination, a wheel, semi-circular rings demountably attached to said wheel, links attached to said semi-circular rings, stops for limiting the pivotal movement of said links, arms pivoted to said links and carrying at their outer ends said spikes, the inner ends of said arms projecting beyond the pivotal point thereof and adapted to engage said semi-circular rings to limit the movement of said arms.

15. In combination, a wheel, spikes, semi-circular rings secured to said wheel, links pivoted to said semi-circular rings, arms pivoted to said links and carrying at their outer ends said spikes, and stops on said semi-circular rings against which the inner ends of said arms are adapted to engage to limit the pivotal movement of said arms and links when the vehicle to which the wheel is attached is moving forwardly, the inner ends of said arms being adapted to engage the outer periphery of said semi-circular rings when said vehicle is traveling in the reverse direction.

16. In combination, a wheel, rings mounted on opposite sides of said wheel, spikes extending transversely across the rim of the wheel and connected at their opposite ends to said rings, each of said rings being in two parts to permit the removal of the rings from the wheel without disconnecting the spikes from said rings.

17. In combination, a wheel, a ring connected to opposite sides of said wheel, a plurality of spikes, a pair of arms connected to the spikes and each connected at its inner ends to said rings, said rings being in two parts to permit removal of the rings together with the spikes from said wheel.

18. In combination, a wheel, links pivoted to said wheel, arms pivoted to said links, spikes on the outer ends of said arms, and abutments on said wheel against which the inner ends of said arms engage to limit the movement thereof.

19. In combination, a wheel, links pivoted to said wheel, arms pivoted to said links, and spikes on the outer ends of said arms, the inner ends of said arms being adapted to engage and move along coöperating surfaces of said wheel.

20. In combination, a wheel, abutting surfaces on said wheel, links pivoted to said wheel, arms pivoted to said links, spikes on the outer ends of said arms, the inner ends of said arms being adapted to engage said surfaces on said wheel, and means for limiting the movement of said links.

In testimony whereof I have hereunto set my hand in presence of two subscribing witnesses.

JOCELYN EMILE OLLIVIER.

Witnesses:
 TERNAND BROISAT,
 EUGENE JURUM.

Copies of this patent may be obtained for five cents each, by addressing the "Commissioner of Patents, Washington, D. C."